(12) United States Patent
Mundy

(10) Patent No.: US 8,166,146 B2
(45) Date of Patent: Apr. 24, 2012

(54) PROVIDING IMPROVED MESSAGE HANDLING PERFORMANCE IN COMPUTER SYSTEMS UTILIZING SHARED NETWORK DEVICES

(75) Inventor: Michael Basil Mundy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/239,966

(22) Filed: Sep. 29, 2008

(65) Prior Publication Data

US 2010/0082788 A1    Apr. 1, 2010

(51) Int. Cl.
G06F 15/173    (2006.01)
(52) U.S. Cl. .......... 709/223; 709/224; 709/225
(58) Field of Classification Search ........... 714/6, 15, 714/20; 709/201, 202, 203, 213, 223, 224, 709/225
See application file for complete search history.

(56) References Cited

U.S. PATENT DOCUMENTS

| | | | | | |
|---|---|---|---|---|---|
| 5,404,488 | A | * | 4/1995 | Kerrigan et al. | 711/133 |
| 6,101,181 | A | * | 8/2000 | Passint et al. | 370/352 |
| 6,167,423 | A | * | 12/2000 | Chopra et al. | 718/100 |
| 6,425,101 | B1 | * | 7/2002 | Garreau | 714/727 |
| 6,594,698 | B1 | * | 7/2003 | Chow et al. | 709/226 |
| 6,711,632 | B1 | * | 3/2004 | Chow et al. | 710/29 |
| 7,523,344 | B2 | * | 4/2009 | Qiao et al. | 714/6.32 |
| 7,593,993 | B2 | * | 9/2009 | Adams et al. | 709/206 |
| 2005/0053057 | A1 | * | 3/2005 | Deneroff et al. | 370/360 |
| 2005/0097158 | A1 | * | 5/2005 | Carmeli et al. | 709/200 |
| 2006/0031427 | A1 | * | 2/2006 | Jain et al. | 709/220 |
| 2006/0236152 | A1 | | 10/2006 | Archer et al. | |
| 2007/0044103 | A1 | * | 2/2007 | Rosenbluth et al. | 718/104 |
| 2007/0150425 | A1 | | 6/2007 | Bryant et al. | |
| 2007/0168695 | A1 | | 7/2007 | Chen et al. | |
| 2007/0204137 | A1 | * | 8/2007 | Tran | 712/214 |
| 2007/0255835 | A1 | | 11/2007 | Coppinger et al. | |
| 2008/0082979 | A1 | | 4/2008 | Coppinger et al. | |
| 2008/0092030 | A1 | | 4/2008 | Archer et al. | |
| 2008/0120435 | A1 | | 5/2008 | Moreira et al. | |
| 2008/0195892 | A1 | | 8/2008 | Archer et al. | |
| 2009/0007150 | A1 | * | 1/2009 | Li et al. | 719/321 |
| 2010/0095305 | A1 | * | 4/2010 | Akizuki | 718/107 |

OTHER PUBLICATIONS

IBM, "Method for Optimizing Message Handling for Streaming I/O Operations", IP.com no IPCOM000146556D, IP.com Prior Art Database, Technical Disclosure, Feb. 16, 2007, Available at the web site, http://priorartdatabase.com/IPCOM/000146556.

(Continued)

Primary Examiner — John Follansbee
Assistant Examiner — Dhairya A Patel
(74) Attorney, Agent, or Firm — Matthew J. Bussan

(57) ABSTRACT

In a massively parallel computer system embodiment, when receiving a message at a compute node from an input/output node, the compute node performs the steps of: obtaining a lock on a collective network device; checking a shared storage location for a message pending for a thread; if such a message is pending, receiving the message's remaining packets directly to a user's buffer, unlocking, and returning; if no such message is pending, receiving one packet from the network device; if the packet indicates that the message is for the thread, receiving the message's remaining packets directly to the user's buffer, unlocking, and returning; and if the packet indicates that the message is for another thread, updating the shared storage location with a thread id of the other thread, unlocking, waiting for a time out, locking, and repeating from the checking step. Accordingly, data copying is eliminated with an attendant performance benefit.

5 Claims, 7 Drawing Sheets

OTHER PUBLICATIONS

Matt Welsh, et al, "Incorporating Memory Management into User-Level Network Interfaces", Department of Computer Science, Cornell University, Ithaca, New York 1997, 10 pgs. Available at the web site, http://www.cs.berkeley.edu/~culler/hoti97/unet.ps.

* cited by examiner

PROVIDING IMPROVED MESSAGE HANDLING PERFORMANCE IN COMPUTER SYSTEMS UTILIZING SHARED NETWORK DEVICES

BACKGROUND OF THE INVENTION

1. Field of Invention

The present invention relates in general to the computer systems field. More particularly, the present invention relates to improving the message handling performance in a computer system that utilizes a shared network device, such as a massively parallel computer system or a distributed computer system.

2. Background Art

Supercomputers continue to be developed to tackle sophisticated computing jobs. These computers are particularly useful to scientists for high performance computing (HPC) applications including life sciences, financial modeling, hydrodynamics, quantum chemistry, molecular dynamics, astronomy, space research and climate modeling. Supercomputer developers have focused on massively parallel computer structures to solve this need for increasingly complex computing needs. A family of such massively parallel computers is being developed by International Business Machines Corporation (IBM) under the name Blue Gene. In the Blue Gene computer systems, the system is generally organized into processing sets (referred to herein as "psets") that contain one input/output (I/O) node and a number of compute nodes based on the configuration of the system. For each pset, the compute nodes and the I/O node communicate with each other by sending messages using a point-to-point feature of a collective network that connects each compute node with its I/O node.

In the Blue Gene computer systems, the I/O node of each pset generally has two main functions. First, the I/O node is used to control the compute nodes using a control message mode. Second, the I/O node is used to offload I/O operations from the compute nodes using a streaming message mode. The two message modes (i.e., control message mode and streaming message mode) have differing requirements with respect to message handling. In control message mode, the I/O node needs to receive a message from every compute node in its pset before sending reply messages back to the compute node. In streaming message mode, the I/O node needs to receive a request message, process the I/O request, and send the reply message before handling another message.

The Blue Gene computer systems communicate over several communication networks. The compute nodes are arranged into both a logical tree network and a logical 3-dimensional torus network. The logical tree network connects the compute nodes in a binary tree structure so that each node communicates with a parent and two children. Each compute node communicates with its I/O node through the tree network (also referred to herein as a "collective network"). The torus network logically connects the compute nodes in a lattice-like structure that allows each compute node to communicate with its closest six neighbors.

The Blue Gene/L system is a scalable system in which the current architected maximum number of compute nodes is 131,072 (1024 compute nodes per rack×128 racks), and the current maximum number of I/O nodes is 16,384 (128 I/O nodes per rack with an 8:1 compute node to I/O node ratio× 128 racks). Each of the Blue Gene/L compute nodes consists of a single ASIC (application specific integrated circuit) with two CPUs and memory. Currently, the number of compute nodes in a pset can be 8, 16, 32, or 64 in the Blue Gene/L system. The full computer would be housed in 128 racks or cabinets, with thirty-two node cards or boards in each rack. Currently, the biggest Blue Gene/L system is 104 racks. The maximum number of compute nodes per node card is thirty-two. The maximum number of I/O nodes is 128 per rack (i.e., each rack has two midplanes and each midplane may contain 8-64 I/O nodes).

The Blue Gene/P system is a scalable system in which the current architected maximum number of compute nodes is 262,144 (1024 compute nodes per rack×256 racks), and the current maximum number of I/O nodes is 16,384 (64 I/O nodes per rack with a 16:1 compute node to I/O node ratio× 256 racks). The Blue Gene/P compute nodes and I/O nodes each consist of a single ASIC with four CPUs and memory. Currently, the number of compute nodes in a pset can be 16, 32, 64, or 128 in the Blue Gene/P system. The full computer would be housed in 256 racks or cabinets, with thirty-two node cards or boards in each rack. The maximum number of compute nodes per node card is thirty-two, and the maximum number of I/O nodes per node card is two.

Generally, when receiving messages from a network device, packets (i.e., each message includes a plurality of packets) need to be received as quickly as possible for best performance. The network device is typically shared by two or more CPUs (also referred to herein as "processors") and is managed by the operating system, so the network device can be shared by multiple users. Typically, this sharing of the network device requires receiving the packets into a temporary buffer and then copying the complete message to the user's buffer. This sequence of operations (also referred to herein as a "memory copy" and "data copying") significantly reduces message handling performance but is typically required because the identity of the processor that is to receive the packets is indeterminate until all of the packets have been stored in the temporary buffer. A header may be utilized to identify the processor that is to receive the packets (e.g., each message may include a one packet header), but because the packets are typically not delivered in order the processor to receive the packets effectively remains unknown until all of the packets have been stored in the temporary buffer.

An additional reason this performance-robbing sequence of operations is typically required occurs when the processors that share the network device can start a thread on another processor, for example, in symmetric multi-processing (SMP) mode. This sequence of operations is required in systems with additional threading capability because the identity of the processor running the thread that is to receive the packets is indeterminate until all of the packets have been stored in the temporary buffer.

On the Blue Gene/L system, each compute node has one collective network device that is shared by the compute node's two processors. The compute node kernel (CNK) running on the compute node processors uses the collective network device to send and receive messages from an I/O node daemon running on the I/O node. When an application is started on the compute nodes, control message mode is used to communicate with the I/O node. When the application is running on the compute nodes, streaming message mode is used to communicate with the I/O node.

IBM, "Method for optimizing message handling for streaming I/O operations", IP.com no. IPCOM000146556D, IP.com Prior Art Database, Technical Disclosure, Feb. 16, 2007, discloses a method to dynamically switch between control message mode and streaming message mode to improve the message handling performance of streaming message mode. When submitting a job, control message mode is used to exchange control messages between the compute nodes and the I/O node in a pset. In the control message mode, a temporary buffer (i.e., a kernel buffer) is used. When running an application, the CNK switches to streaming message mode in which data can be put directly into the user's buffer without using a memory copy (i.e., receiving the packets into a temporary buffer and then copying the complete message to the user's buffer). However, the method disclosed in the above-noted IP.com Prior Art Database reference is directed to the Blue Gene/L system, which does not have additional threading capability (i.e., where the processors that share the network device can start a thread on another processor, for example, in symmetric multi-processing (SMP) mode), and does not address the performance-robbing need to use a memory copy in a system with additional threading capability.

In control message mode, as noted above, the I/O node receives the request messages from both processors on all of the compute nodes in its pset before sending any reply messages. The above-noted IP.com Prior Art Database reference discloses that during the control message mode, the CNK locks the collective network device, sends all of the packets in a request message to the I/O node, and unlocks the network device. Then the CNK waits for a reply message by locking the network device, checking for a packet, receiving one or more packets if available, and unlocking the network device. The CNK keeps checking for packets until a complete message has been received. In control message mode, it is possible for one processor to receive a packet intended for the other processor. For example, one processor may receive all of the packets of one reply message intended for that processor and all of the packets of another reply message intended for the other processor. Data in the packet header (i.e., there is a header on every packet) identifies which processor the reply message is intended for. Accordingly, each packet of the reply message is stored into a kernel buffer assigned to the processor in a shared data area of the compute node's memory.

In streaming message mode, as noted above, the I/O node receives a request message, processes the I/O request, and sends the reply message before handling another message. The above-noted IP.com Prior Art Database reference discloses that during the streaming message mode, the CNK locks the collective network device, sends all of the packets in a request message to the I/O node, receives all of the packets in the reply message, and unlocks the device. Since each processor has the collective network device locked for the complete exchange of the request and reply messages, the CNK knows that all of the packets in the reply message are for itself and the data can be put directly into the user's buffer. This method eliminates a memory copy of the user's data from a kernel buffer to the user's buffer. Even in the streaming message mode, as in the control message mode, there is a header on every packet. However, as noted above, the method disclosed in the IP.com Prior Art Database reference is directed to the Blue Gene/L system, which does not have additional threading capability (i.e., where the processors that share the network device can start a thread on another processor, for example, in SMP mode). The method disclosed in the IP.com Prior Art Database reference does not address the performance-robbing need to use such a memory copy in a system with additional threading capability.

On the Blue Gene/P system, each compute node has one collective node device that is shared by the compute node's four processors. The compute node kernel running on the compute node processors uses the collective network device to send and receive messages from an I/O node daemon running on the I/O node. The compute nodes in the Blue Gene/P system may be utilized in SMP mode, dual mode, or virtual node mode (VNM). There is no additional threading capability in VNM. However, both SMP mode and dual mode have additional threading capability. In SMP mode, for example, one of the processors runs a program's main process and the program can spawn up to three additional threads on the remaining processors.

The method disclosed in the IP.com Prior Art Database reference can be utilized to eliminate the use of a memory copy in VNM mode on the Blue Gene/P system because there is no additional threading capability in VNM. However, because both SMP mode and dual mode have additional threading capability, the method disclosed in the IP.com Prior Art Database reference can not be utilized to eliminate the use of a memory copy in SMP mode or dual mode on the Blue Gene/P system. Consequently, in SMP mode and dual mode on the Blue Gene/P system, the packets must be stored into a temporary buffer and then the complete message is copied to the user's buffer. This sequence of operations significantly reduces message handling performance but is required in systems with additional threading capability, such as the Blue Gene/P system, because the identity of the processor running the thread that is to receive the packets is indeterminate until all of the packets have been stored in the temporary buffer.

It should therefore be apparent that a need exists for improved message handling performance in computer systems, such as massively parallel computer systems or distributed computer systems, having shared network devices.

SUMMARY OF THE INVENTION

According to the preferred embodiments of the present invention, when receiving a message at a compute node (CN) from an input/output (I/O) node in a massively parallel computer system, the compute node performs the steps of: obtaining a lock on a collective network device (ND) of the compute node; checking a shared storage location of the compute node to see if a message is pending for a thread running on a processor of the compute node; if a message is pending for the thread, receiving the message's remaining packets (i.e., each message includes a plurality of packets) directly to a user's buffer, unlocking the network device, and returning; if no message is pending for the thread, receiving one packet from the network device; if the one packet indicates that the message is for the thread, receiving the message's remaining packets directly to the user's buffer, unlocking the network device, and returning; and if the one packet indicates that the message is for another thread, updating the shared storage location with a thread id of the other thread, unlocking the network device, waiting for a time out to expire, obtaining a lock on the network device, and repeating from the checking step. Accordingly, data copying (i.e., receiving the packets into a temporary buffer and then copying the complete message to the user's buffer) may be eliminated with an attendant performance benefit.

According to the preferred embodiments of the present invention, when sending a message to the compute node from the I/O node, all of the packets in the message are sent together so a complete message with the packets in order is delivered to the compute node. Also, according to the preferred embodiments of the present invention, each message sent from the I/O node to the compute node has a one packet header that includes a thread id identifying a thread to which the message is to be delivered, but the remaining packets of the message have no header that identifies the thread for which the packets are intended.

The parallel computer embodiments are described with respect to the Blue Gene architecture but can be implemented on any parallel computer system with multiple processors arranged in a network structure. The preferred embodiments are particularly advantageous for massively parallel computer systems. Other embodiments are described with respect to a distributed computer system architecture.

The foregoing and other features and advantages of the present invention will be apparent from the following more particular description of the preferred embodiments of the present invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements.

DETAILED DESCRIPTION OF THE PREFERRED EMBODIMENTS 1.0 Overview

In accordance with the preferred embodiments of the present invention, when receiving a message at a compute node (CN) from an input/output (I/O) node in a massively parallel computer system, the compute node performs the steps of: obtaining a lock on a collective network device (ND) of the compute node; checking a shared storage location of the compute node to see if a message is pending for a thread running on a processor of the compute node; if a message is pending for the thread, receiving the message's remaining packets (i.e., each message includes a plurality of packets) directly to a user's buffer, unlocking the network device, and returning; if no message is pending for the thread, receiving one packet from the network device; if the one packet indicates that the message is for the thread, receiving the message's remaining packets directly to the user's buffer, unlocking the network device, and returning; and if the one packet indicates that the message is for another thread, updating the shared storage location with a thread id of the other thread, unlocking the network device, waiting for a time out to expire, obtaining a lock on the network device, and repeating from the checking step. Accordingly, data copying (i.e., receiving the packets into a temporary buffer and then copying the complete message to the user's buffer) may be eliminated with a concomitant performance benefit.

In accordance with the preferred embodiments of the present invention, when sending a message to the compute node from the I/O node, all of the packets in the message are sent together so a complete message with the packets in order is delivered to the compute node. Also, in accordance with the preferred embodiments of the present invention, each message sent from the I/O node to the compute node has a one packet header that includes a thread id identifying a thread to which the message is to be delivered, but the remaining packets of the message have no header that identifies the thread for which the packets are intended.

2.0 Detailed Description

The present invention relates to an apparatus, method and computer readable medium for improving the message handling performance in a computer system, such as a massively parallel computer system or a distributed computer system, that utilizes a shared network device. The preferred embodiments will be described with respect to the Blue Gene/P massively parallel computer system being developed by International Business Machines Corporation (IBM). The term massively parallel as used herein will mean more than a few processors in a parallel computer system. In addition, the preferred embodiments will be described with respect to a distributed computer system.

Figure 1:
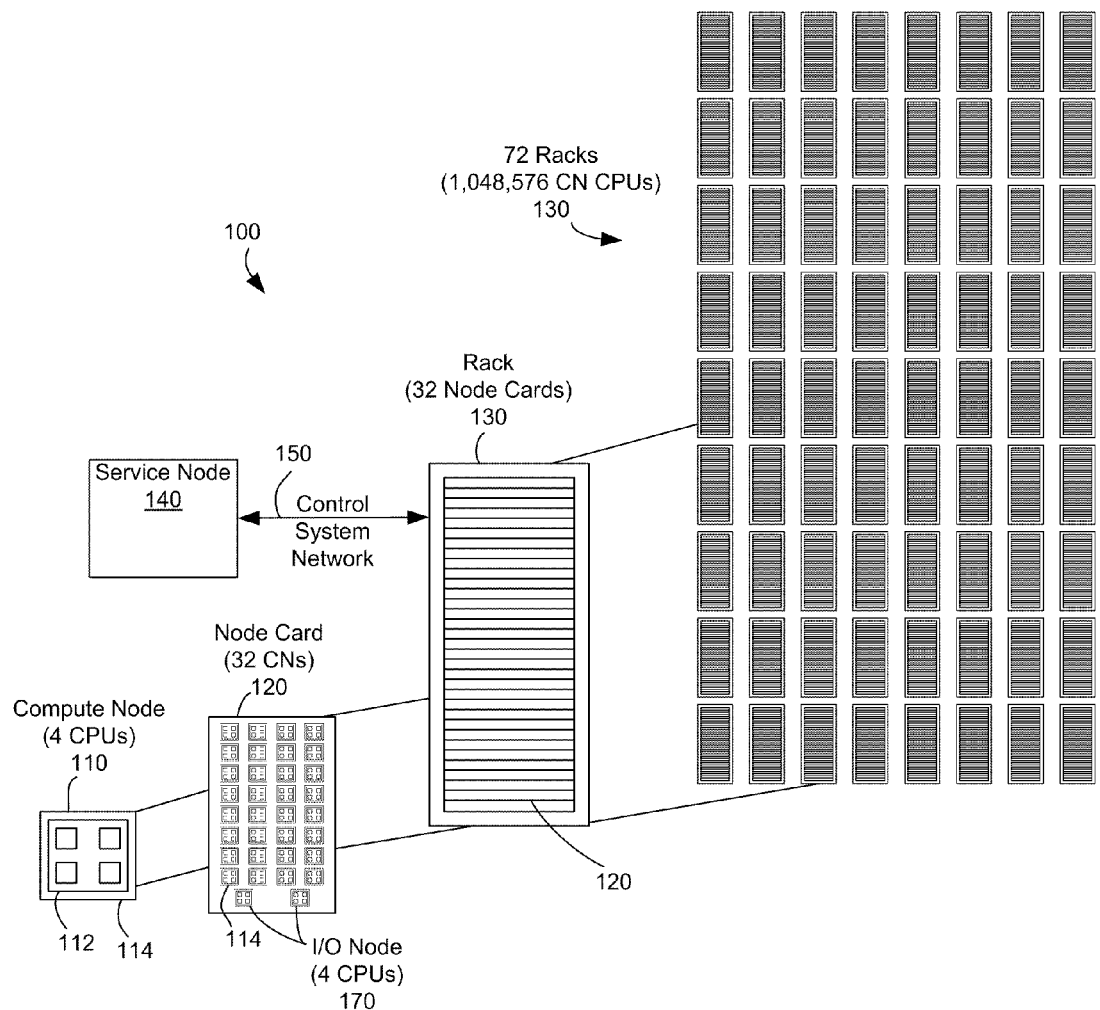
FIG. 1 is a block diagram of a massively parallel computer system according to the preferred embodiments of the present invention.

FIG. 1 shows a block diagram that represents a massively parallel computer system 100 such as the Blue Gene/P computer system. The Blue Gene/P system is a scalable system in which the current architected maximum number of compute nodes is 262,144 (1024 compute nodes per rack×256 racks), and the current maximum number of input/output (I/O) nodes is 16,384 (64 I/O nodes per rack with a 16:1 compute node to I/O node ratio×256 racks). Each compute node 110 consists of a single application specific integrated circuit (ASIC) 112 with four CPUs and memory on a compute card 114 (also referred to as a "node daughter card"). Each compute node 110 typically has between 2.0 and 4.0 gigabytes of local memory. A node card 120 (also referred to as a "node board") accommodates thirty-two compute cards 114 each having a compute node 110. Thus, each node card 120 has thirty-two compute nodes 110, with four processors for each compute node, and the associated memory for each processor. A rack 130 (also referred to as a "cabinet") is a housing that contains thirty-two node cards 120. The full Blue Gene/P computer system would be housed in 256 racks 130 with thirty-two node cards 120 in each. The full system would then have 262,144 compute nodes (256 racks×32 node cards×32 compute nodes) and 1,048,576 compute node CPUs (257 racks× 32 node cards×32 compute nodes×4 CPUs).

Again referring to FIG. 1, the computer system 100 includes a service node 140 that handles the loading of the nodes with software and controls the operation of the whole system. Among the software loaded onto the nodes by the service node 140 is a message handling algorithm (410 in FIG. 4) for providing improved message handling performance in accordance with the preferred embodiments of the present invention.

The service node 140 is typically a minicomputer system that includes a control console (not shown in FIG. 1). The service node 140 is connected to the racks 130 of the compute nodes 110 with a control system network 150. The control system network 150 includes various network interfaces that provide the necessary communication for the massively parallel computer system. The network interfaces are described further below. One or more I/O nodes 170 (two shown in FIG. 1) each located on a node card 120 handle(s) communications from the service node 140 to a number of compute nodes. In the Blue Gene/P system, zero, one or two I/O nodes 170 is/are installed on each node card 120 to communicate with 1024 compute nodes in a rack. In other words, the maximum number of I/O nodes 170 per node card 120 is two. Thus, the full system would then have 16,384 I/O nodes (256 racks×32 node cards×2 I/O nodes).

On the Blue Gene/P system, although the compute nodes 110 and the I/O nodes 170 perform different functions, these components are actually interchangeable parts. Thus, like the compute nodes 110, each I/O node 170 consists of a single application specific integrated circuit (ASIC) 112 with four CPUs and memory on a compute card 114, or node daughter card. Each I/O node 170 typically has between 2.0 and 4.0 gigabytes of local memory. The full system would then have 65,536 I/O node CPUs (256 racks×32 node cards×2 I/O nodes×4 CPUs).

The Blue Gene/P supercomputer communicates over several networks. The 262,144 compute nodes 110 and the 16,384 I/O nodes 170 are arranged into both a logical tree network and a logical 3-dimensional torus network. The torus network logically connects the compute nodes in a lattice-like structure that allows each compute node 110 to communicate with its closest six neighbors. Further, the Blue Gene/P computer system structure can be described as a compute node core with an I/O node surface, where communication to a number of compute nodes 110 is handled by each I/O node 170 connected to the service node 140. The I/O nodes are connected to the compute nodes through the tree network and also have functional wide area network capabilities through a gigabit Ethernet network.

Other communication networks include a JTAG network and a Barrier network. The JTAG network provides communication for testing and control from the service node 140 over the control system network 150 as shown in FIG. 1. The barrier network uses a barrier communication block (324 in FIG. 3) to implement software barriers for synchronization of similar processes on the compute nodes to move to a different phase of processing upon completion of some task.

Figure 2:
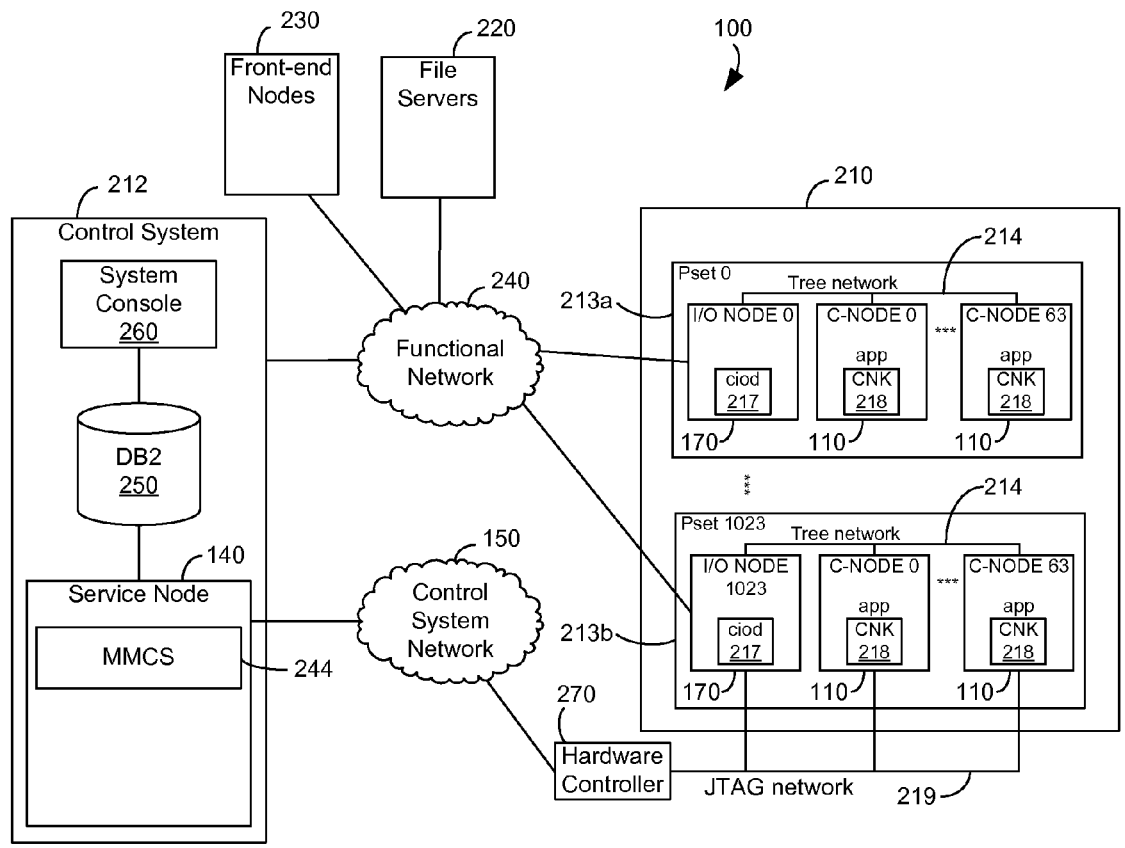
FIG. 2 is another system block diagram of a massively parallel computer system according to the preferred embodiments of the present invention.

FIG. 2 shows another system block diagram that represents another way to view the system architecture of the Blue Gene/P computer system to illustrate further details of the preferred embodiments. FIG. 2 includes a representation of all the compute nodes 110 of the computer system 100 as a compute core 210 connected to a control system 212 of the computer system 100. The compute core 210 communicates with the service node 140 of the control system 212 over the control system network 150 as described briefly above with reference to FIG. 1. The compute core 210 is connected to the control system network 150 through a hardware controller 270 that is connected to each I/O node 170 and compute node 110 through a JTAG network 219. The hardware controller 270 resides in the rack 130 (shown in FIG. 1) and provides an interface for the control system 212 to configure the compute nodes 110 and load data into the compute nodes' memory. In the Blue Gene/L computer system, the hardware controller 270 is called the "iDo chip".

Further, as shown in FIG. 2, the compute core 210 also communicates with file servers 220 and the front end-nodes 230 over a functional network 240. The file servers 220 store data for user applications and system images. The front-end nodes 230 hold compilers and programs for user interaction with the computer system 100. The control system 212 includes a database, called "DB2" 250 connected to the front-end nodes 230 and the service node 140. The DB2 holds block tables and other hardware information used by the midplane management and control system (MMCS) 244 in the service node 140. The MMCS 244 is responsible for controlling the allocation of hardware in the compute core 210 and loading the compute nodes 110 with system images and data files (i.e., system images and data files 218, which include a "compute node kernel" or "CNK") as described further below. In accordance with the preferred embodiments of the present invention, the CNK loaded onto each compute node 110 by the MMCS 244 includes a message handling algorithm (410 in FIG. 4) for providing improved message handling performance when receiving a message at the compute node 110 from an I/O node 170 (or from another compute node 110).

The MMCS 244 is also responsible for loading the I/O nodes 170 with system images and data files (i.e., system images and data files 217, which include a "control and I/O daemon" or "CIOD") as described further below. One skilled in the art will appreciate that, like the CNK loaded onto the compute nodes 110 by the MMCS 244, the CIOD loaded onto the I/O nodes 170 by the MMCS 244 may include a message handling algorithm (analogous to the message handling algorithm 410 in FIG. 4) for providing improved message handling performance when receiving a message at an I/O node 170 from a compute one 110.

The control system 212 is also connected to the functional network 240. In the preferred embodiments, this connection allows the control system 212 to detect when a hardware block has completed the boot process after being loaded with system images and data files. The control system 212 further includes a console 260 for use by system administrators.

Again referring to FIG. 2, the compute core 210 illustrates the compute nodes 110 housed in racks 130 (shown in FIG. 1). The compute nodes are grouped in 1024 psets that are illustrated by representation, where pset_0 213a and pset_1023 213b are shown explicitly and the remaining (pset_1 through pset_1022) are implied. A pset is a group of 16, 32, 64, or 128 compute nodes 110 that are grouped together in a set for communication with an I/O node 170. The I/O node 170 provides communication over the functional network and other networks to the compute nodes 110 in the pset. In the Blue Gene/P system, an I/O node 170 communicates with between 16 and 128 compute nodes 110, represented by C-NODE_0 to C-NODE_63.

Each compute node 110 in each pset communicates with that pset's I/O node 170 through a tree network 214 (also referred to herein as a "collective network") utilizing a tree communication block (322 in FIG. 3) in each compute node 110 and the I/O node 170. As discussed in more detail below with reference to FIG. 3, the tree communication block (322 in FIG. 3) is also referred to herein as a "collective network device". In the Blue Gene computer systems, the tree network 214 has a point-to-point mode that allows messages (i.e., each message includes a plurality of packets) to be sent to a specific node in the collective network.

Again referring to FIG. 2, each compute node 110 includes system image and data files 218 stored in local memory of the compute node 110. The system image files include system files such as an operating system kernel (also referred to herein as a "compute node kernel" or "CNK"). The system image files 218 with the CNK are stored in volatile memory of the compute node and must be loaded with the needed software and allocated into a block before the compute node can be utilized. In accordance with the preferred embodiments of the present invention, the CNK includes a message handling algorithm (410 in FIG. 4) for providing improved message handling performance.

Still referring to FIG. 2, each I/O node 170 includes system image and control data files 217 stored in local memory of the I/O node 170. The system image files include system files such as a control and I/O daemon (also referred to herein as a "CIOD"). The CIOD 217 is a process (i.e., a user-mode daemon) that runs on the I/O node and provides a bridge between the compute nodes and the outside world. The CIOD 217 receives messages from multiple input sources, processes the message, and returns a result. For example, the CIOD 217 receives an I/O request message from the CNK 218, processes the I/O request message, and sends a reply message.

In accordance with the preferred embodiments of the present invention, when sending a message from an I/O node 170 to a compute node 110, all of the packets in the message (i.e., each message includes a plurality of packets) are sent together so a complete message with the packets in order is delivered to the compute node 110. One skilled in the art will appreciate that such a guaranteed "in order" delivery of packets may also be utilized when sending a message from a compute node 110 to an I/O node 170, or when sending a message from a compute node 110 to another compute node 110. On the Blue Gene computer systems, the compute nodes 170 and the I/O nodes 110 are connected via a collective network 214 with guaranteed packet delivery.

Also, in accordance with the preferred embodiments of the present invention, each of the messages has a one packet header that includes a thread id identifying a thread to which the message is to be delivered, but the remaining packets of the message have no header that identifies the thread for which the packets are intended. Hence, in accordance with the preferred embodiments of the present invention, when sending a message from an I/O node 170 to a compute node 110, each message begins (i.e., the message is delivered using a guaranteed "in order" delivery of packets, as discussed above) with a one packet header that includes a thread id identifying a thread to which the message is to be delivered. One skilled in the art will appreciate that such a one packet header may also be utilized when sending a message from a compute node 110 to an I/O node 170, or when sending a message from a compute node 110 to another compute node 110.

In the Blue Gene/P supercomputer, each rack is divided into two midplanes with a service card providing communication from the service node 140 to each midplane. The midplanes each have half of the rack's thirty-two node cards 120 (shown in FIG. 1). In the Blue Gene/P computer system, the pset is the basic granule size of a cluster of compute nodes and I/O nodes. When a cluster of hardware (one or more psets) is being utilized together to run a software application it is called a block. Thus, one or more midplanes of hardware can be allocated to a block.

When a user sets up an application to run on the computer system, a request is made to the service node 140 to allocate a cluster of computer hardware into a block to run the software application. Since the compute and I/O nodes have volatile memory for their operating systems they must be loaded with the proper software and the hardware allocated prior to the application software being able to run. Typically, the block allocation is done after the request by the application.

Figure 3:
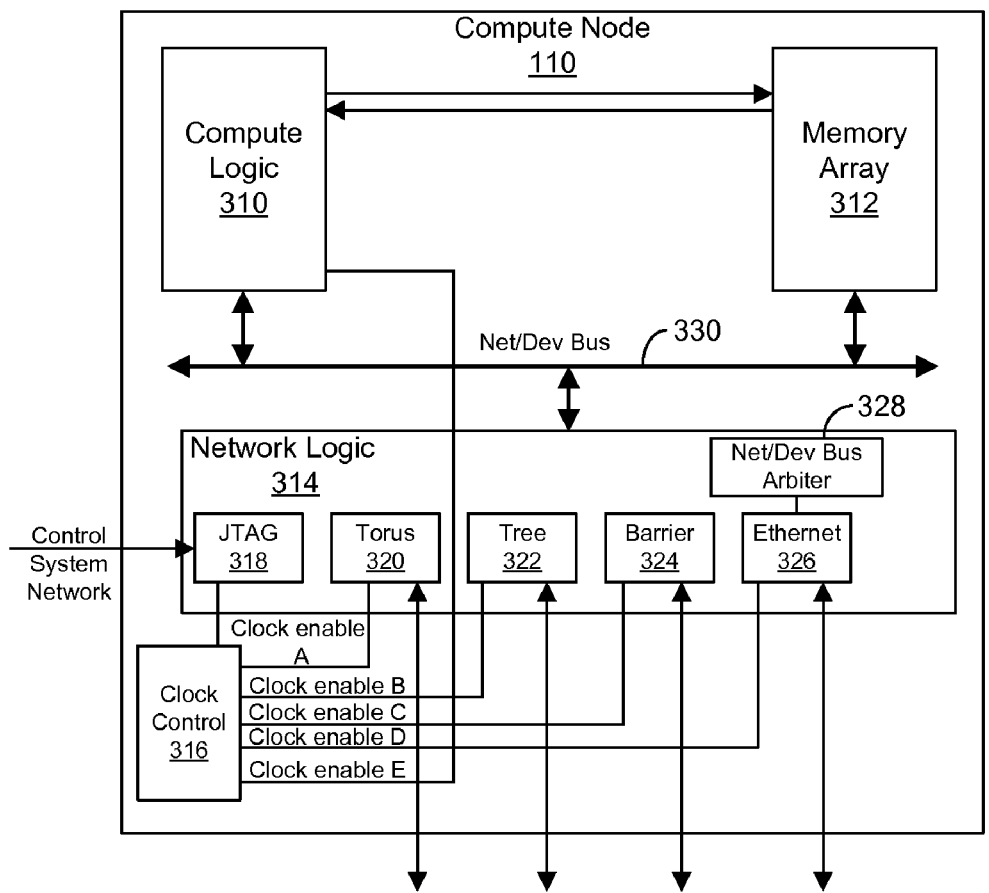
FIG. 3 is a block diagram of a compute node in a massively parallel computer system according to the preferred embodiments of the present invention.

FIG. 3 shows a block diagram that represents a compute node 110 of a computer system such as the Blue Gene/P computer system. The compute node 110 has compute logic 310 that would include the four CPUs (402, 404, 406 and 408 in FIG. 4) for this node. The compute logic 310 of the compute node is connected to a memory array 312 for storing local data. The compute node 110 further includes a network logic block 314 that has communication logic for the compute node to communicate with the other nodes in the system and with the service node 140. Each compute node 110 also includes a clock control circuit 316 to control the clocks of all of the different blocks in the compute node.

Again referring to FIG. 3, the network logic block 314 of the compute node 110 includes logic to communicate over the communication networks. Specifically, the network logic block 314 includes a JTAG communication block 318, a torus communication block 320, a tree communication block 322, a barrier communication block 324, and an Ethernet communication block 326. The tree communication block 322 is also referred to herein as the "collective network device".

As shown in FIG. 3, the compute node 110 includes a network/device bus arbiter 328. The network/device arbiter 328 is a logic block connected between the various communication blocks of the network logic block 314 and Dev/Bus 330. The network device/bus arbiter 328 functions to arbitrate access to the shared DevBus 330. The Dev/Bus 330 is a communication bus on the compute node 110 that carries communication signals between the various blocks of the compute node such as the compute logic block 310, the memory array 312 and the various communication blocks of the network logic blocks (i.e., the JTAG communication block 318, the torus network communication block 320, the tree communication block 322, the barrier communication block 324, and the Ethernet communication block 326).

Typically, the net/dev arbiter 328 includes a device control register (not shown in FIG. 3) that has registers to enable control signals to the various logic blocks in the compute node 110 shown in FIG. 3, including the compute logic block 310 and the network logic block 314, to control access. Access to the communication blocks of the network logic block 314, such as the torus communication block 320 and tree communication block 322, by the compute logic block is disabled by setting bits in the device control register of the net/dev arbiter 328. Thus, the device control register of the net/dev arbiter 328 can be used to enable arbitration access between the compute logic block 310 and the communication blocks of the network logic block 314

In accordance with the preferred embodiments of the present invention, the net/device arbiter 328 is utilized by the CNK (218 in FIG. 4) or other software running on each the four CPUs (402, 404, 406 and 408 in FIG. 4) of the compute node 110 to obtain a lock on the collective network device (i.e., the tree communication block 322). For example, the CNK or other software running on one of the four CPUs of the compute node 110 may utilize the network/device arbiter 328 to obtain a lock on the collective network device, and thereby prevent the other three of the four CPUs of the compute node 110 from accessing the collective network device until the collective network device is unlocked.

Figure 4:
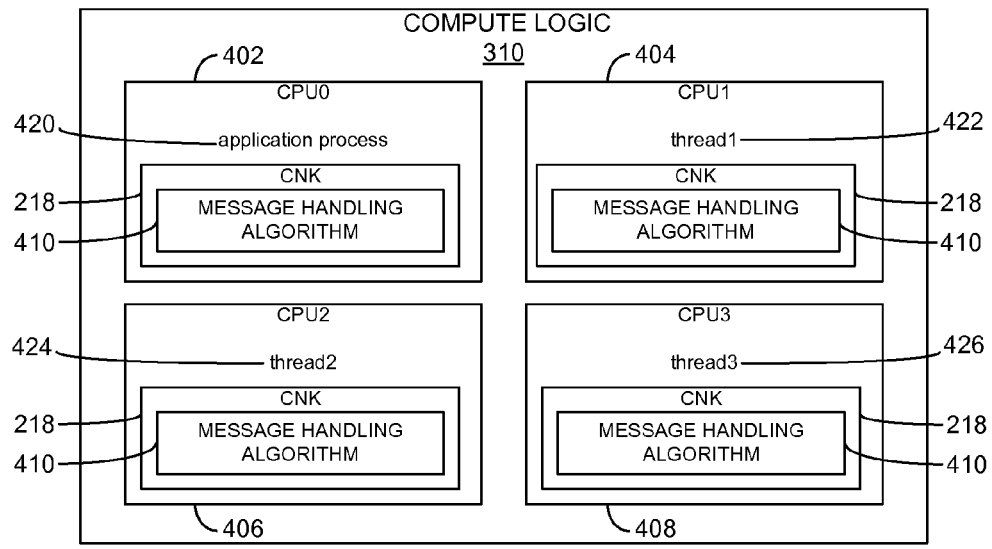
FIG. 4 is a block diagram of a compute logic block in the compute node shown in FIG. 3 in symmetric multi-processing (SMP) mode according to the preferred embodiments of the present invention.

FIG. 4 is a block diagram of the compute logic block 310 in the compute node 110 shown in FIG. 3 in symmetric multi-processing (SMP) mode according to the preferred embodiments of the present invention. The compute logic block 310 includes four CPUs 402, 404, 406 and 408 (CPU0, CPU1, CPU2, CPU3). The compute logic block 310 shown in FIG. 4 represents the compute logic block of a computer system that can operate in SMP mode, such as the Blue Gene/P computer system. In SMP mode, one processor (i.e., CPU0) runs a main process 420 of an application program, which can spawn up to three additional threads 422, 424 and 426 (thread1, thread2, thread3) on the remaining processors (i.e., CPU1, CPU2, CPU3). The main process 420 of the application program running on the processor 402 (CPU0) has an MPI (message passing interface) rank zero.

Figure 5:
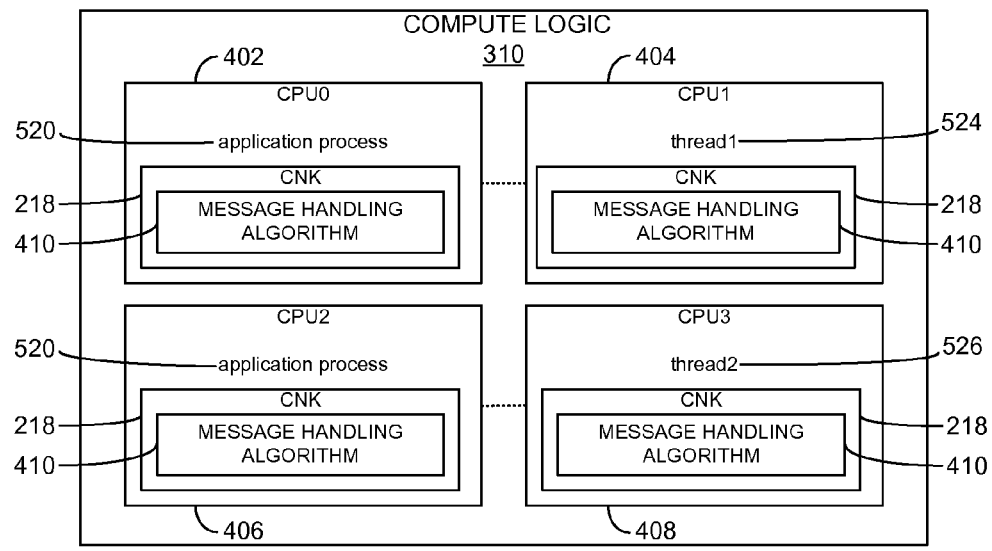
FIG. 5 is a block diagram of a compute logic block in the compute node shown in FIG. 3 in dual mode according to the preferred embodiments of the present invention.

FIG. 5 is a block diagram of a compute logic block 310 in the compute node 110 shown in FIG. 3 in dual mode according to the preferred embodiments of the present invention. The compute logic block 310 includes four CPUs 402, 404, 406 and 408 (CPU0, CPU1, CPU2, CPU3). The compute logic block 310 shown in FIG. 5 represents the compute logic block of a computer system that can operate in dual mode, such as the Blue Gene/P computer system. In dual mode, two processors 402 and 406 (i.e., CPU0 and CPU2) each run a main process 520 of an application program. The main process 520 of the application program running on processor 402 (CPU0) has an MPI rank zero, while the main process 520 of the application program running on processor 406 (CPU2) has an MPI rank one. Each of these processors 402 and 406 (CPU0 and CPU2) can spawn one additional thread. There is a fixed relationship (denoted by a dotted line in FIG. 5) between the processors in dual mode. Thus, processor 402 (CPU0) cannot start a thread on processors 404 and 408 (CPU1 and CPU3) and leave only the main process 520 of the application program running on processor 406 (CPU2). The processor 402 (CPU0) is only allowed to send work to the processor 404 (CPU1), and likewise, the processor 406 (CPU2) can only use the processor 408 (CPU3) for additional threads.

Referring now to both FIGS. 4 and 5, in accordance with the preferred embodiments of the present invention, each of the four processors 402, 404, 406 and 408 (CPU0, CPU1, CPU2, CPU3) runs a CNK 218 that includes a message handling algorithm 410, which as discussed below with reference to FIG. 8, functions to provide improved message handling performance. As mentioned earlier, each compute node has one collective network device (322 in FIG. 3) that is shared by the compute node's four processors 402, 404, 406 and 408 (CPU0, CPU1, CPU2, CPU3). The embodiments shown in FIGS. 4 and 5 each have additional threading capability, i.e., the compute node's four processors that share the network device can start a thread on another processor (e.g., in SMP mode in FIG. 4 and in dual mode FIG. 5). In accordance with the preferred embodiments of the present invention, the message handling algorithm 410 provides improved message handling performance by eliminating data copying (i.e., receiving the packets into a temporary buffer and then copying the complete message to the user's buffer) that is typically required when receiving a message at a compute node which utilizes a shared network device and which has additional threading capability (e.g., in SMP mode or dual mode).

Again referring to both FIGS. 4 and 5, as mentioned earlier, the system image files, which in accordance to the preferred embodiments of the present invention include the CNK 218 and the message handling algorithm 410, are stored in volatile memory (312 in FIG. 3) of the compute node and must be loaded with the needed software and allocated into a block before the compute node can be utilized. The MMCS (244 in FIG. 2) is responsible for controlling the allocation of hardware in the compute core and loading the compute nodes with system images and data files, including the CNK 218 and the message handling algorithm 410.

Figure 6:
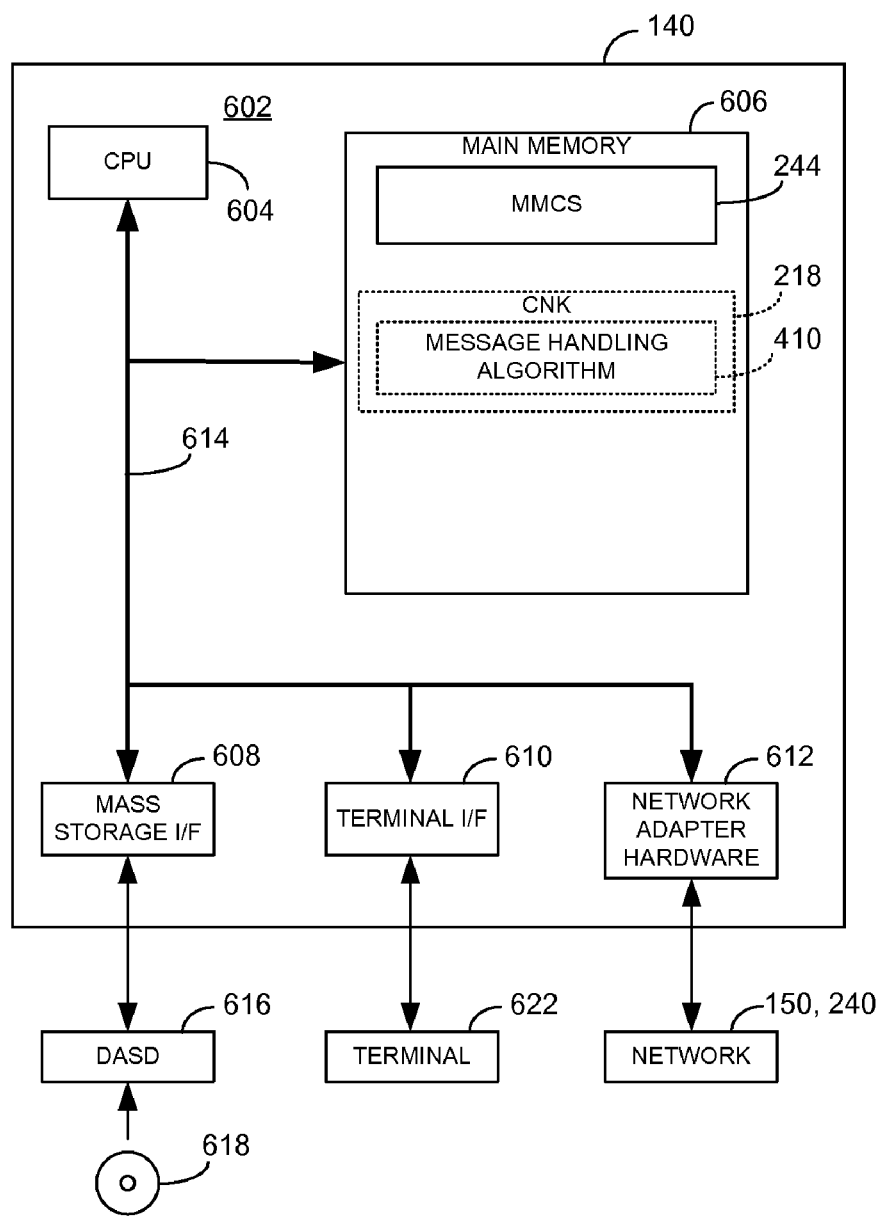
FIG. 6 is a block diagram of a service node in a massively parallel computer system according to the preferred embodiments of the present invention.

FIG. 6 is a detailed view of an information processing system such as the service node 140. FIG. 6 is a block diagram illustrating a detailed view of the service node 140 according to the preferred embodiments of the present invention. The service node 140, in one exemplary embodiment of the present invention, is based upon a suitably configured processing system adapted to implement one or more aspects of the exemplary embodiment. Any suitably configured processing system is similarly able to be used as the service node 140 by embodiments of the present invention, for example, a personal computer, workstation, or the like.

The service node 140 includes a computer 602. The computer 602 has a processor 604 that is communicatively connected to a main memory 606 (e.g., volatile memory), non-volatile storage interface 608, terminal interface 610, and network adapter hardware 612. A system bus 614 interconnects these components. The non-volatile storage interface 608 is used to one or more connect mass storage devices, such as a data storage device 616 (e.g., direct access storage device, or "DASD"), to the service node 140. One specific type of data storage device is a computer readable medium drive such as a CD drive, which may be used to store data to and read data from a computer readable medium (e.g., a CD-ROM 618, or floppy diskette (not shown)).

The main memory 606 includes the MMCS 244. In addition, in accordance with the preferred embodiments of the present invention, the main memory 606 contains, at least temporarily, the system images and data files (e.g., the CNK 218 and the message handling algorithm 410) to be loaded onto the compute nodes by the MMCS 244 utilizing the network adapter hardware 612 and the control system network 150. These components were described in greater detail above. Although illustrated as concurrently resident in the main memory 606, it is clear that respective components of the main memory 606 are not required to be completely resident in the main memory 606 at all times or even at the same time. In one embodiment, the service node 140 utilizes conventional virtual addressing mechanisms to allow programs to behave as if they have access to a large, single storage entity, referred to herein as a computer system memory, instead of access to multiple, smaller storage entities such as the main memory 606 and the data storage device 616. Note the term "computer system memory" is used herein to generically refer to the entire virtual memory of the service node 140.

Before (or in lieu of) being resident in the main memory 606, the system images and data files (e.g., the CNK 218 and the message handling algorithm 410) may be stored on the DASD 616 and/or the CD-ROM 618 or other computer readable medium, or may be received from the network adapter hardware 612 (e.g. via the functional network 240 or some other network).

Although only one CPU 604 is illustrated for the computer 602, computer systems with multiple CPUs can be used equally effectively. Embodiments of the present invention further incorporate interfaces that each includes separate, fully programmed microprocessors that are used to off-load processing from the CPU 604. The terminal interface 610 is used to directly connect one or more terminals 622 to the computer system 602 to provide a user interface to the computer 602. The terminals 622, which are able to be non-intelligent or fully programmable workstations, are used to allow system administrators and users to communicate with the computer 602. The terminal 622 is also able to consist of user interface and peripheral devices that are connected to the computer 602 and controlled by terminal interface hardware included in the terminal interface 610 that includes video adapters and interfaces for keyboards, pointing devices, and the like.

An operating system (not shown), according to an embodiments of the present invention, is included in the main memory 606 and is a suitable multitasking operating system such as the Linux, UNIX, Windows Vista, and Windows Server operating system. Embodiments of the present invention are able to use any other suitable operating system, or kernel, or other suitable control software. Some embodiments of the present invention utilize architectures, such as an object oriented framework mechanism, that allows instructions of the components of the operating system (not shown) to be executed on any processor located within the computer 602.

The network adapter hardware 612 is used to provide an interface to various networks 150 and 240. Embodiments of the present invention are able to work with any data communications connections including present day analog and/or digital techniques or via a future networking mechanism.

Although the exemplary embodiments of the present invention are described in the context of a fully functional computer system, those skilled in the art will appreciate that embodiments of the present invention are capable of being distributed as a program product via a CD-ROM 618, or other form of recordable media, or via any type of electronic transmission mechanism.

Figure 7:
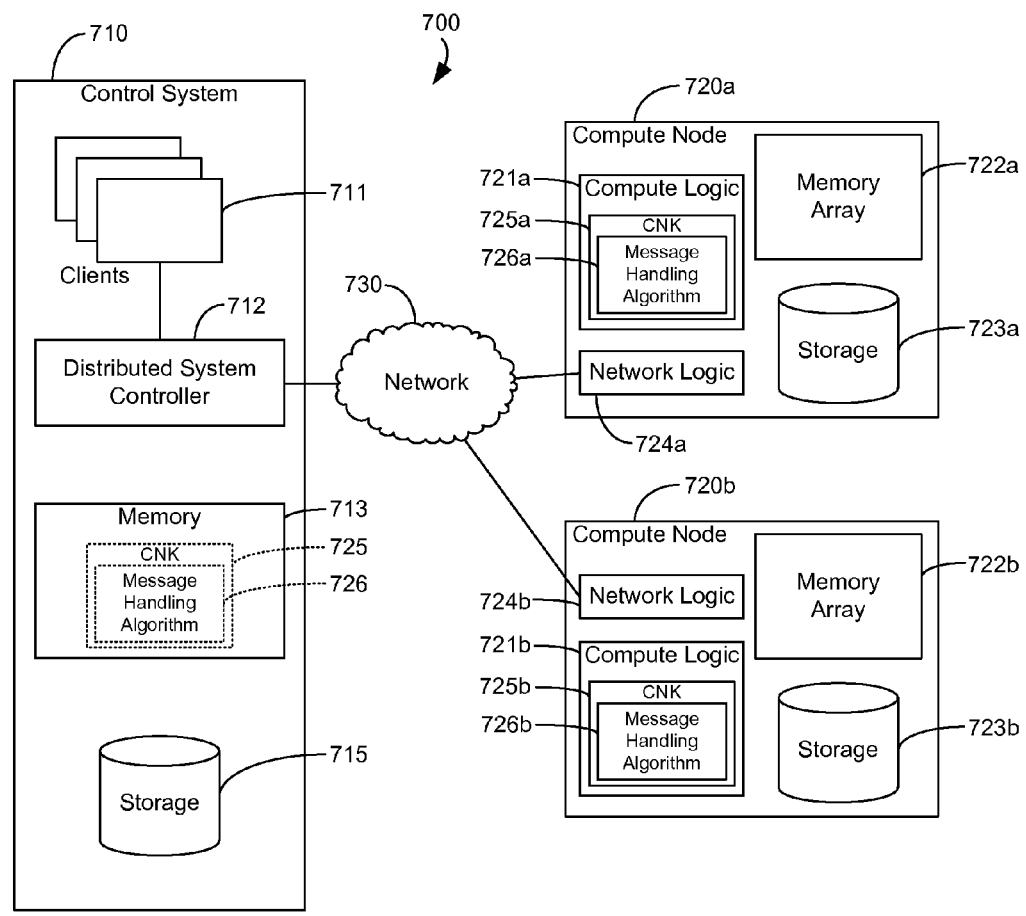
FIG. 7 is a block diagram of a distributed computer system according to the preferred embodiments of the present invention.

FIG. 7 shows a block diagram of a distributed computer system 700 according to the preferred embodiments of the present invention. In one specific distributed computing environment, a group of remotely located computers are harnessed together to work together in a similar fashion as described above in the Blue Gene computer examples. In the distributed computer system the compute nodes are more remotely located and may not have a homogeneous nature since the distributed computers may be of different types. However, the architecture is quite similar with respect to the described Blue Gene examples. In the distributed computer system, there are multiple computers that comprise the compute nodes that are connected by a control system and interconnected by a network. The distributed computer system can similarly benefit from having the compute nodes include a compute node kernel or "CNK", operating system, or other software having a message handling algorithm that can receive packets directly to the user's buffer and thus provide improved message handling performance. This eliminates data copying (i.e., receiving the packets into a temporary buffer and then copying the complete message to the user's buffer) that is typically required when receiving a message at a compute node which utilizes a shared network device and which has additional threading capability (e.g., in SMP mode or dual mode). The CNK, operating system, or other software that includes the message handling algorithm in accordance with the preferred embodiments of the present invention may be stored in non-volatile memory on the compute nodes of the distributed computer system, or may be loaded onto the compute nodes from the control system in a manner analogous to the described above in the Blue Gene computer examples. In the distributed computer system, the CNK, operating system, or other software that includes the message handling algorithm in accordance with the preferred embodiments of the present invention may be different to account for the differences in the different computer platforms in the distributed computer system.

Again referring to FIG. 7, a distributed computer system 700 is illustrated according to the preferred embodiments of the present invention. The distributed computer system 700 includes a control system 710 connected to a number of compute nodes 720a, 720b over a network 730. The compute nodes 720a, 720b represent multiple computers of various types that may be interconnected in the distributed computer system 700. The compute nodes 720a, 720b each have a compute logic block 721a, 721b, a memory array 722a, 722b, a storage facility 723a, 723b, and a network logic block 724a, 724b. The network 730 may be any type of network used in a distributed computer system. Preferably, the network 730 has a point-to-point mode that allows messages to be sent to a specific node in the network. The control system 710 may be centrally located in a single computer of the distributed computer system 700 or the control system may also be distributed over multiple computers (not shown). The control system 710 has multiple clients 711 that request access to computer resources. The clients 711 include software applications that may be located locally or distributed (not shown).

The compute logic block 721a, 721b of the compute nodes 720a, 720 each includes a plurality of processors (not shown in FIG. 7). The network logic 724a, 724b of the compute node 720a, 720b each includes a network device (not shown in FIG. 7) that is shared by the processors in the compute logic block 721a, 721b. For example, the network device in the network logic 724a, 724b of each compute node 720a, 720b may be shared by the processors in the compute logic block 721a, 721b in a manner similar to the collective network device (322 in FIG. 3) in the Blue Gene computer examples. The processors of the compute logic block 721a, 721b can start a thread on another processor (e.g., in symmetric multi-processing (SMP) mode or dual mode). For example, the processors of the compute logic block 721a, 721b may correspond with the processors (402, 404, 406, 408 in FIGS. 4 and 5) in the Blue Gene computer examples.

The processors of the compute logic block 721a, 721b each run a CNK 725a, 725b, an operating system, or other software with a message handling algorithm 726a, 726b that can receive packets directly to the user's buffer in accordance with the preferred embodiments of the present invention and thus provide improved message handling performance.

In accordance with the preferred embodiments of the present invention, when sending a message from the control system 710 to a compute node 720a, 720b, all of the packets in the message (i.e., each message includes a plurality of packets) are sent together so a complete message with the packets in order is delivered to the compute node 720a, 720b. One skilled in the art will appreciate that such a guaranteed "in order" delivery of packets may also be utilized when sending a message from a compute node 720a, 720b to the control system 710, or when sending a message from a compute node 720a, 720b to another compute node 720a, 720b.

Also, in accordance with the preferred embodiments of the present invention, each of the messages has a one packet header that includes a thread id identifying a thread to which the message is to be delivered. Hence, in accordance with the preferred embodiments of the present invention, when sending a message from the control system 710 to a compute node 720a, 720b, each message begins (i.e., the message is delivered using a guaranteed "in order" delivery of packets, as discussed above) with a one packet header that includes a thread id identifying a thread to which the message is to be delivered. One skilled in the art will appreciate that such a one packet header may also be utilized when sending a message from a compute node 720a, 720b to the control system 710, or when sending a message from a compute node 720a, 720b to another compute node 720a, 720b.

Again referring to FIG. 7, the control system 710 includes a distributed system controller 712 that controls the flow of work to the compute nodes 720a, 720b in response to service request from the clients 711. The distributed system controller 712 according to the preferred embodiments of the present invention operates similar to prior art distributed system controllers. The control system 710 also includes a local memory 713 and a storage facility 715. In most respects, embodiments directed to the distributed computer system operate in the same manner as described above with respect to the parallel computer system embodiments.

The CNK 725a, 726b, operating system, or other software with the message handling algorithm 726a, 726b in accordance with the preferred embodiments of the present invention may be stored in non-volatile memory (e.g., storage facility 723a, 723b) on the compute nodes 720a, 720b of the distributed computer system 700, or may be loaded onto the compute nodes 720a, 720b from the control system 710 in a manner analogous to the described above in the Blue Gene computer examples. For example, the CNK 725, operating system, or other software with the message handling algorithm 726 in accordance with the preferred embodiments of the present invention may be stored, at least temporarily, in the local memory 713 of the control system 710 and then loaded onto the compute nodes 720a, 720b from the control system 710 over the network 730.

Figure 8:
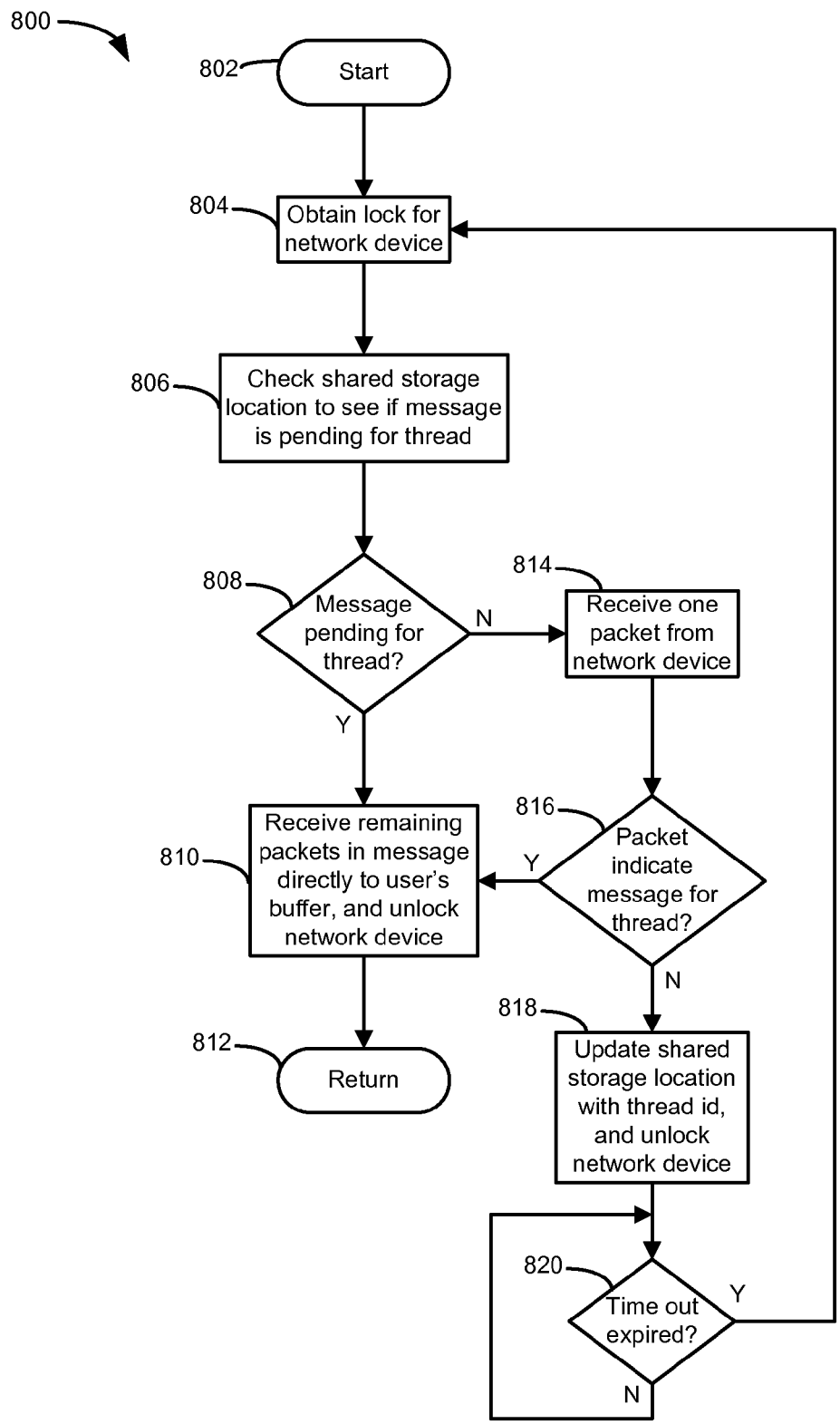
FIG. 8 is a method flow diagram for providing improved message handling performance in a computer system that utilizes a shared network device according to the preferred embodiments of the present invention.

FIG. 8 shows a method 800 for providing improved message handling performance in a computer system that utilizes a shared network device in accordance with the preferred embodiments of the present invention. The method 800 corresponds to the message handling algorithm 410 shown in FIGS. 4, 5 and 6, as well as the message handling algorithm 726, 726a, 726b shown in FIG. 7. In the method 800, the steps discussed below (steps 802-820) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 800 begins when a message is received at a compute node from an I/O node (step 802).

In accordance with the preferred embodiments of the present invention, each message includes a plurality of packets are delivered "in order". Also, in accordance with the preferred embodiments of the present invention, each message includes a one packet header that containing a thread id which identifies a thread to which the message is to be delivered. The one packet header may also contain other information such as control information.

The compute node receiving the message obtains a lock on the network device (step 804). For example, referring temporarily to FIG. 4, the CNK 218 running on one of the processors (e.g., the processor 404 (CPU1) having a thread 422 (thread1) running thereon) in the compute logic block 310 of the compute node (110 in FIG. 3) receiving the message may obtain a lock on the network device (i.e., the tree communication block 322 in FIG. 3). Still referring temporarily to FIG. 4, one or more of the other processors (e.g., the processor 406 (CPU2) having a thread 424 (thread2) running thereon, the processor 408 (CPU3) having a thread 426 (thread3) running thereon, and/or the processor 402 (CPU0) having no additional thread running thereon) in the compute logic block 310 of the compute node (110 in FIG. 3) receiving the message may each perform this (step 804) and subsequent steps (sequentially, one processor after the other) during a time out step described below with respect to step 820.

Referring back to FIG. 8, after completing step 804, the compute node receiving the message checks a shared storage location of the compute node's memory array block to see if a message is pending for a first thread running on one of the processors of the compute node's compute logic block (step 806). For example, referring temporarily to FIG. 4, the CNK 218 running on the processor 404 (CPU1), which also has the thread 422 (thread1) running thereon, checks a shared storage location of the compute node's memory array block (312 in FIG. 3) to see if a message is pending for the thread 422 (thread1). The shared storage location is a storage location in the compute node's memory array block that is shared by each of the processors in the compute node's compute logic block. The CNK 218 determines whether or not a message is pending for the thread 422 (thread1) based on whether or not the shared storage location contains the thread id of the thread 422 (thread1). If the shared storage location contains the thread id of the thread 422 (thread1), then the thread id of the thread 422 (thread1) was previously placed in the shared storage location by the CNK 218 running on another one of the processors (e.g., the processor 402 (CPU0), the processor 406 (CPU2), or the processor 408 (CPU3)) during an updating step described below with respect to step 818. Still referring temporarily to FIG. 4, one or more of the other processors (e.g., the processor 406 (CPU2) having the thread 424 (thread2) running thereon, the processor 408 (CPU3) having the thread 426 (thread3) running thereon, and/or the processor 402 (CPU0) having no additional thread running thereon) in the compute logic block 310 of the compute node (110 in FIG. 3) receiving the message may each perform this (step 806) and subsequent steps (sequentially, one processor after the other) during a time out step described below with respect to step 820.

Again referring to FIG. 8, after completing step 806, the compute node receiving the message determines whether a message is pending for the first thread (step 808). For example, referring temporarily to FIG. 4, the CNK 218 running on the processor 404 (CPU1) determines whether or not a message is pending for the thread 422 (thread1), which is also running on the processor 404 (CPU1), based on the CNK's check of the shared storage location in step 806. As mentioned above, the CNK 218 determines whether or not a message is pending for the thread 422 (thread1) based on whether or not the shared storage location contains the thread id of the thread 422 (thread1). As also mentioned above, if the shared storage location contains the thread id of the thread 422 (thread1), then the thread id of the thread 422 (thread1) was previously placed in the shared storage location by the CNK 218 running on another one of the processors (e.g., the processor 402 (CPU0), the processor 406 (CPU2), or the processor 408 (CPU3)) during an updating step described below with respect to step 818. Still referring temporarily to FIG. 4, one or more of the other processors (e.g., the processor 406 (CPU2) having the thread 424 (thread2) running thereon, the processor 408 (CPU3) having the thread 426 (thread3) running thereon, and/or the processor 402 (CPU0) having no additional thread running thereon) in the compute logic block 310 of the compute node (110 in FIG. 3) receiving the message may each perform this (step 808) and subsequent steps (sequentially, one processor after the other) during a time out step described below with respect to step 820.

Referring back to FIG. 8, if the compute node determines in step 808 that a message is pending for the first thread, then the compute node receives the remaining packets in the message directly to a user's buffer and unlocks the network device (step 810), and returns (step 812). For example, referring temporarily back to FIG. 4, if the CNK 218 running on the processor 404 (CPU1) determines in step 808 that a message is pending for the thread 422 (thread1), which is also running on the processor 404 (CPU1), then in step 808 the CNK 218 receives the remaining packets in the message (i.e., the message's packets subsequent to the one packet header) directly to a user's buffer (i.e., a buffer defined by the user application, such as the application process 420 running on the processor 402 (CPU0)) and unlocks the network device (i.e., the tree communication block 322 in FIG. 3), and then in step 810 the CNK 218 returns. The user's buffer is typically defined in a storage location of the compute node's memory array block (312 in FIG. 3) but may be defined in any storage location within the entire computer system (100 in FIG. 1). Still referring temporarily to FIG. 4, one or more of the other processors (e.g., the processor 406 (CPU2) having the thread 424 (thread2) running thereon, the processor 408 (CPU3) having the thread 426 (thread3) running thereon, and/or the processor 402 (CPU0) having no additional thread running thereon) in the compute logic block 310 of the compute node (110 in FIG. 3) receiving the message may each perform these steps (step 810 and 812) (sequentially, one processor after the other) during a time out step described below with respect to step 820.

In step 810, the compute node receives the remaining packets in the message directly to a user's buffer. This eliminates data copying (i.e., receiving the packets into a temporary buffer and then copying the complete message to the user's buffer) that is typically required when receiving a message at a compute node which utilizes a shared network device and which has additional threading capability (e.g., in SMP mode or dual mode).

Once again referring to FIG. 8, if the compute node determines in step 808 that no message is pending for the first thread, then the compute node receives one packet from the from the network device (step 814). For example, referring temporarily back to FIG. 4, if the CNK 218 running on the processor 404 (CPU1) determines in step 808 that no message is pending for the thread 422 (thread1), which is also running on the processor 404 (CPU1), then in step 814 the CNK 218 receives one packet from the network device (i.e., the tree communication block 322 in FIG. 3). In accordance with the preferred embodiments of the present invention, the one packet received from the network device in step 814 is the one packet header of the message received by the compute node. Still referring temporarily to FIG. 4, one or more of the other processors (e.g., the processor 406 (CPU2) having the thread 424 (thread2) running thereon, the processor 408 (CPU3) having the thread 426 (thread3) running thereon, and/or the processor 402 (CPU0) having no additional thread running thereon) in the compute logic block 310 of the compute node (110 in FIG. 3) receiving the message may each perform this (step 814) and subsequent steps (sequentially, one processor after the other) during a time out step described below with respect to step 820.

Referring back to FIG. 8, the compute node determines whether the one packet received from the network device in step 814 indicates that the message is for the first thread (step 816). For example, referring temporarily to FIG. 4, the CNK 218 running on the processor 404 (CPU1), which is also running the thread 422 (thread1), determines in step 816 whether or not the one packet (i.e., the one packet header) received from the network device (i.e., the tree communication block 322 in FIG. 3) in step 814 indicates that the message is for the thread 422 (thread1). The CNK 218 makes this determination based on the thread id in the one packet (i.e., the one packet header) received from the network device. Still referring temporarily to FIG. 4, one or more of the other processors (e.g., the processor 406 (CPU2) having the thread 424 (thread2) running thereon, the processor 408 (CPU3) having the thread 426 (thread3) running thereon, and/or the processor 402 (CPU0) having no additional thread running thereon) in the compute logic block 310 of the compute node (110 in FIG. 3) receiving the message may each perform this (step 816) and subsequent steps (sequentially, one processor after the other) during a time out step described below with respect to step 820.

Again referring to FIG. 8, if the compute node determines in step 816 that the one packet received from the network device indicates that the message is for the first thread, then the compute node receives the remaining packets in the message directly to a user's buffer and unlocks the network device (step 810), and returns (step 812). As noted above, the determination in step 816 is based on the thread id in the one packet (i.e., the one packet header) received from the network device. The steps 810 and 812 were described in detail above.

On the other hand, if the compute node determines in step 816 that the one packet received from the network device indicates that the message is for a thread other than the first thread, then the compute node updates a shared storage location of the compute node's memory array block with a thread id of the other thread and unlocks the network device (step 818). For example, referring temporarily back to FIG. 4, if the CNK 218 running on the processor 404 (CPU1), which is also running the thread 422 (thread1), determines in step 816 that the one packet received from the network device (i.e., the tree communication device 322 in FIG. 3) indicates that the message is for a thread (e.g., the thread 424 (thread2) running on the processor 406 (CPU2) or the thread 426 (thread3) running on the processor 408 (CPU3)) other than the thread 422 (thread1) running on the processor 404 (CPU1), then in step 818 the CNK 218 updates the shared storage location on the compute node's memory array block with the thread id of the other thread and unlocks the network device. As noted above, the determination in step 816 is based on the thread id in the one packet (i.e., the one packet header) received from the network device. As also noted above, the shared storage location is a storage location in the compute node's memory array block that is shared by each of the processors in the compute node's compute logic block. By updating the shared storage location with the thread id of the other thread (i.e., the thread to which the message is to be delivered), the CNK 218 running on the processor 404 (CPU1) makes it possible for the CNK 218 running on another processor, which is also running the thread to which the message is to be delivered, to subsequently determine in step 808 that the message is pending for that thread. Still referring temporarily to FIG. 4, one or more of the other processors (e.g., the processor 406 (CPU2) having the thread 424 (thread2) running thereon, the processor 408 (CPU3) having the thread 426 (thread3) running thereon, and/or the processor 402 (CPU0) having no additional thread running thereon) in the compute logic block 310 of the compute node (110 in FIG. 3) receiving the message may each perform this (step 818) and subsequent steps (sequentially, one processor after the other) during a time out step described below with respect to step 820.

Referring back to FIG. 8, after step 818, the compute node waits for a time out to expire (step 820), and then repeats the method 800 by obtaining a lock on the network device (step 804). For example, referring temporarily to FIG. 4, the CNK 218 running on the processor 404 (CPU1), which is also running the thread 422 (thread1), waits for a time out to expire in step 820, and then repeats the method 800 by obtaining a lock on the network device in step 804 (as described in detail above). The length of the time out is selected to permit one or more of the other processors (e.g., the processor 406 (CPU2) having the thread 424 (thread2) running thereon, the processor 408 (CPU3) having the thread 426 (thread3) running thereon, and/or the processor 402 (CPU0) having no additional thread running thereon) to perform the method 800 before the processor 404 (CPU1) repeats the method 800.

While the preferred embodiments of the present invention have been particularly described within the context of compute nodes each having a compute logic block with a plurality of processors wherein one processor can start a thread on another processor (e.g., in symmetric multi-processing (SMP) mode or dual mode), the present invention is also applicable in other contexts as well. For example, the present invention is applicable to processes as well as threads.

One skilled in the art will appreciate that many variations are possible within the scope of the present invention. For example, while a massively parallel computing system embodiment of the present invention has been particularly described within the context of a compute node receiving a message from an I/O node, the present application is also applicable in other contexts including an I/O node receiving a message from a compute node, or a compute node receiving a message from another compute node. Thus, while the present invention has been particularly shown and described with reference to the preferred embodiments thereof, it will be understood by those skilled in the art that these and other changes in form and detail may be made therein without departing from the spirit and scope of the present invention.

What is claimed is:

1. A parallel computer system, comprising:
   an input/output (I/O) node;
   a plurality of compute nodes coupled to each other and to the I/O node via a collective network, each compute node comprising:
   a compute logic block having a plurality of processors, wherein one of the processors runs a first thread, and wherein another of the processors runs a main process of an application program that spawned the first thread to run on said one of the processors;
   a memory array block shared by the processors;
   a network logic block having one or more communication blocks, wherein at least one of the communication blocks comprises a collective network device for facilitating communication of messages between the compute node and the I/O node, each message comprising a plurality of packets, wherein the collective network has a point-to-point mode that allows messages to be sent to a specific node in the collective network, wherein when sending a message to one of the compute nodes from the I/O node, all of the packets in the message are sent together so a complete message with the packets in order is delivered to the compute node, and wherein each of the messages has a one packet header that includes a thread ID identifying a thread to which the message is to be delivered;
   wherein when receiving a message at the compute node, the compute node performs the steps of:
   (a) obtaining a lock on the network device;
   (b) checking a shared storage location of the memory array block for a one packet header containing a thread ID identifying the first thread to see if a message is pending for the first thread;
   (c) if a message is pending for the first thread based on the checking step (b), receiving the remaining packets in the message directly to a user's buffer, unlocking the network device, and returning;
   (d) if no message is pending for the first thread based on the checking step (b), receiving a one packet header of a message from the network device;
   (e) if the one packet header received in step (d) indicates that the message is for the first thread, receiving the remaining packets in the message directly to the user's buffer, unlocking the network device, and returning;
   (f) if the one packet header received in step (d) indicates that the message is for a thread other than the first thread, updating the shared storage location of the memory array block with a thread ID of the other thread, unlocking the network device, waiting for a time out to expire, obtaining a lock on the network device, and repeating from the checking step (b);
   wherein an I/O node daemon runs on the I/O node, wherein a compute node kernel (CNK) runs on each of the processors, and wherein the compute node operates in at least one of a symmetric multi-processor (SMP) mode and a dual mode, comprising: when the compute node operates in the SMP mode, a first one of the processors runs a main process of an application program in the SMP mode, wherein the first thread is spawned to run on a second one of the processors by the application program's main process running on the first processor, wherein steps (a)-(f) are performed by the CNK running on the second processor, and wherein a third one of the processors runs a second thread spawned by the application program's main process running on the first processor;
   when the compute node operates in the dual mode, a first one and a second one of the processors each runs a main process of an application program in the dual mode, wherein the first thread is spawned to run on a third one of the processors by the application program's main process running on the first processor wherein steps (a)-(f) are performed by the CNK running on the third processor, and wherein a fourth one of the processors runs a second thread spawned by the application program's main process running on the second processor.

2. The parallel computer system as recited in claim 1, wherein the network logic block includes a JTAG communication block, a torus communication block, a tree communication block, a barrier communication block and an Ethernet communication block, and wherein the network device comprises the tree communication block.

3. A computer-implemented method for providing improved message handling performance in a parallel computer system utilizing a shared network device, wherein the parallel computer system comprises an input/output (I/O) node and a plurality of compute nodes coupled to each other and to the I/O node via a collective network, each compute node comprises: a compute logic block having a plurality of processors, wherein one of the processors runs a first thread, and wherein another of the processors runs a main process of an application program that spawned the first thread to run on said one of the processors; a memory array block shared by the processors; a network logic block having a collective network device for facilitating communication of messages between the compute node and the I/O node, each message comprising a plurality of packets, wherein the collective network has a point-to-point mode that allows messages to be sent to a specific node in the collective network, wherein when sending a message to one of the compute nodes from the I/O node, all of the packets in the message are sent together so a complete message with the packets in order is delivered to the compute node, and wherein each of the messages has a one packet header that includes a thread ID identifying a thread to which the message is to be delivered; wherein when receiving a message at the compute node, the compute node performs the computer-implemented method comprising the steps of:

(a) obtaining a lock on the network device;
   (b) checking a shared storage location of the memory array block for a one packet header containing a thread ID identifying the first thread to see if a message is pending for the first process;
   (c) if a message is pending for the first thread based on the checking step (b), receiving the remaining packets in the message directly to a user's buffer, unlocking the network device, and returning;

(d) if no message is pending for the first thread based on the checking step (b), receiving a one packet header of a message from the network device;

(e) if the one packet header received in step (d) indicates that the message is for the first thread, receiving the remaining packets in the message directly to the user's buffer, unlocking the network device, and returning;

(f) if the one packet header received in step (d) indicates that the message is for a thread other than the first thread, updating the shared storage location of the memory array block with a thread ID of the other thread, unlocking the network device, waiting for a time out to expire, obtaining a lock on the network device, and repeating from the checking step (b);

wherein an I/O node daemon runs on the I/O node, wherein a compute node kernel (CNK) runs on each of the processors, and wherein the compute node operates in at least one of a symmetric multi-processor (SMP) mode and a dual mode, comprising: when the compute node operates in the SMP mode, a first one of the processors runs a main process of an application program in the SMP mode, wherein the first thread is spawned to run on a second one of the processors by the application program's main process running on the first processor, wherein steps (a)-(f) are performed by the CNK running on the second processor, and wherein a third one of the processors runs a second thread spawned by the application program's main process running on the first processor;

when the compute node operates in the dual mode, a first one and a second one of the processors each runs a main process of an application program in the dual mode, wherein the first thread is spawned to run on a third one of the processors by the application program's main process running on the first processor, wherein steps (a)-(f) are performed by the CNK running on the third processor, and wherein a fourth one of the processors runs a second thread spawned by the application program's main process running on the second processor.

4. A non-transitory computer readable medium for providing improved message handling performance in a parallel computer system utilizing a shared network device, wherein the parallel computer system comprises an input/output (I/O) node and a plurality of compute nodes coupled to each other and to the I/O node via a collective network, each compute node comprises: a compute logic block having a plurality of processors, wherein one of the processors runs a first thread, and wherein another of the processors runs a main process of an application program that spawned the first thread to run on said one of the processors; a memory array block shared by the processors; and a network logic block having a collective network device for facilitating communication of messages between the compute node and the I/O node, each message comprising a plurality of packets, wherein the collective network has a point-to-point mode that allows messages to be sent to a specific node in the collective network, wherein when sending a message to one of the compute nodes from the I/O node, all of the packets in the message are sent together so a complete message with the packets in order is delivered to the compute node, and wherein each of the messages has a one packet header that includes a thread ID identifying a thread to which the message is to be delivered;

the non-transitory computer readable medium comprising a recordable media having instructions recorded thereon that when executed by one or more of the processors of the compute node cause the compute node when receiving a message to perform the steps of:

(a) obtaining a lock on the network device;

(b) checking a shared storage location of the memory array block for a one packet header containing a thread ID identifying the first thread to see if a message is pending for the first thread;

(c) if a message is pending for the first thread based on the checking step (b), receiving the remaining packets in the message directly to a user's buffer, unlocking the network device, and returning;

(d) if no message is pending for the first thread based on the checking step (b), receiving a one packet header of a message from the network device;

(e) if the one packet header received in step (d) indicates that the message is for the first thread, receiving the remaining packets in the message directly to the user's buffer, unlocking the network device, and returning;

(f) if the one packet header received in step (d) indicates that the message is for a thread other than the first thread, updating the shared storage location of the memory array block with a thread ID of the other thread, unlocking the network device, waiting for a time out to expire, obtaining a lock on the network device, and repeating from the checking step (b);

wherein an I/O node daemon runs on the I/O node, wherein a compute node kernel (CNK) runs on each of the processors, and wherein the compute node operates in at least one of a symmetric multi-processor (SMP) mode and a dual mode, comprising:

when the compute, node operates in the SMP mode, a first one of the processors runs a main process of an application program in the SMP mode, wherein the first thread is spawned to run on a second one of the processors by the application program's main process running on the first processor, wherein steps (a)-(f) are performed by the CNK running on the second processor, and wherein a third one of the processors runs a second thread spawned by the application program's main process running on the first processor;

when the compute node operates in the dual mode, a first one and a second one of the processors each runs a main process of an application program in the dual mode, wherein the first thread is spawned to run on a third one of the processors by the application program's main process running on the first processor, wherein steps (a)-(f) are performed by the CNK running on the third processor, and wherein a fourth one of the processors runs a second thread spawned by the application program's main process running on the second processor.

5. A computer-implemented method for providing improved message handling performance in a distributed computer system utilizing a shared network device, wherein the parallel computer system comprises a control system and a plurality of compute nodes coupled to the control system via a network, each compute node comprises: a compute logic block having a plurality of processors, wherein one of the processors runs a first thread, and wherein another of the processors runs a main process of an application program that spawned the first thread to run on said one of the processors; a memory array block shared by the processors; a network logic block having a network device for facilitating communication of messages between the compute node and the control system, each message comprising a plurality of packets, wherein the collective network has a point-to-point mode that allows messages to be sent to a specific node in the collective network, wherein when sending a message to one of the compute nodes from the I/O node, all of the packets in the message are sent together so a complete message with the packets in order is delivered to the compute node, and wherein each of the messages has a one packet header that includes a thread ID identifying a thread to which the message is to be delivered; wherein when receiving a message at the compute node from the control system, the compute node performs the computer-implemented method comprising the steps of:

(a) obtaining a lock on the network device;
(b) checking a shared storage location of the memory array block for a one packet header containing a thread ID identifying the first thread to see if a message is pending for the first thread;
(c) if a message is pending for the first thread based on the checking step (b), receiving the remaining packets in the message directly to a user's buffer, unlocking the network device, and returning;
(d) if no message is pending for the first thread based on the checking step (b), receiving a one packet header of a message from the network device;
(e) if the one packet header received in step (d) indicates that the message is for the first thread, receiving the remaining packets in the message directly to the user's buffer, unlocking the network device, and returning;
(f) if the one packet header received in step (d) indicates that the message is for a thread other than the first thread, updating the shared storage location of the memory array block with a thread ID of the other thread, unlocking the network device, waiting for a time out to expire, obtaining a lock on the network device, and repeating from the checking step (b);

wherein a compute node kernel (CNK) runs on each of the processors, and wherein the compute node operates in at least one of a symmetric multi-processor (SMP) mode and a dual mode, comprising:

when the compute node operates in the SMP mode, a first one of the processors runs a main process of an application program in the SMP mode, wherein the first thread is spawned to run on a second one of the processors by the application program's main process running on the first processor, wherein steps (a)-(f) are performed by the CNK running on the second processor, and wherein a third one of the processors runs a second thread spawned by the application program's main process running on the first processor;

when the compute node operates in the dual mode, a first one and a second one of the processors each runs a main process of an application program in the dual mode, wherein the first thread is spawned to run on a third one of the processors by the application program's main process running on the first processor, wherein steps (a)-(f) are performed by the CNK running on the third processor, and wherein a fourth one of the processors runs a second thread spawned by the application program's main process running on the second processor.

* * * * *